United States Patent
Öberg et al.

(10) Patent No.: US 11,001,261 B2
(45) Date of Patent: May 11, 2021

(54) METHOD AND A SYSTEM FOR CONTROLLING A VEHICLE DURING A DOWNHILL START

(71) Applicant: Volvo Truck Corporation, Gothenburg (SE)

(72) Inventors: Niklas Öberg, Torslanda (SE); Anders Eriksson, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/479,294

(22) PCT Filed: Jan. 23, 2017

(86) PCT No.: PCT/EP2017/051298
§ 371 (c)(1),
(2) Date: Jul. 19, 2019

(87) PCT Pub. No.: WO2018/133948
PCT Pub. Date: Jul. 26, 2018

(65) Prior Publication Data
US 2019/0375411 A1  Dec. 12, 2019

(51) Int. Cl.
*B60T 8/32* (2006.01)
*B60W 30/18* (2012.01)
(Continued)

(52) U.S. Cl.
CPC ....... *B60W 30/18054* (2013.01); *B60T 7/045* (2013.01); *B60W 30/18118* (2013.01); *B60W 30/192* (2013.01); *B60T 2201/06* (2013.01)

(58) Field of Classification Search
CPC .................. B60T 2201/04; B60T 2201/06
See application file for complete search history.

(56) References Cited

U.S. PATENT DOCUMENTS

| | | | | |
|---|---|---|---|---|
| 4,717,207 A | * | 1/1988 | Kubota | B60T 7/122 180/282 |
| 5,514,050 A | * | 5/1996 | Bauerle | F16H 61/21 477/118 |

(Continued)

FOREIGN PATENT DOCUMENTS

| | | |
|---|---|---|
| CN | 1321844 C | 6/2007 |
| CN | 101767587 A | 7/2010 |

(Continued)

OTHER PUBLICATIONS

International Search Report and Written Opinion for International Patent Application No. PCT/EP2017/051298, dated Oct. 10, 2017, 12 pages.

(Continued)

*Primary Examiner* — Nicholas J Lane
(74) *Attorney, Agent, or Firm* — Withrow & Terranova PLLC

(57) ABSTRACT

The invention relates to a method and an arrangement for controlling a vehicle (100) during a downhill start. The vehicle comprises a service brake (131*a*, 131*b*; 132*a*, 132*b*; 33*a*, 133*b*), an engine (119) and a transmission (120) being arranged between the engine and at least one driven axle (123), wherein the service brakes, the engine and the transmission are controlled by an electronic control unit (140). The method involves registering that the vehicle is located on a downhill gradient; registering an action from the driver, indicating a request to start the vehicle; controlling the service brake to maintain the vehicle stationary during a predetermined time after the request before initiating a controlled service brake release; controlling a gradual release of the service brake in response to at least one detected first vehicle operating parameter; and releasing the service brake when detecting that a predetermined threshold (Continued)

for at least one second vehicle operating parameter has been attained.

19 Claims, 6 Drawing Sheets

(51) Int. Cl.
*B60T 7/04* (2006.01)
*B60W 30/192* (2012.01)

(56) References Cited

U.S. PATENT DOCUMENTS

| | | |
|---|---|---|
| 6,346,064 B1 | 2/2002 | Hada et al. |
| 9,126,597 B2 | 9/2015 | Yu et al. |
| 2008/0071454 A1 | 3/2008 | Shiraki |
| 2008/0294319 A1* | 11/2008 | Baijens .................. B60T 8/24 701/70 |
| 2009/0187324 A1 | 7/2009 | Lu et al. |
| 2010/0292902 A1* | 11/2010 | Bach .................. B60T 8/24 701/70 |
| 2013/0144499 A1* | 6/2013 | Dietzel .................. B60T 13/66 701/70 |
| 2014/0088848 A1* | 3/2014 | Owen .................. B60T 8/32 701/70 |
| 2014/0277980 A1* | 9/2014 | Yu .................. B60T 17/221 701/70 |

FOREIGN PATENT DOCUMENTS

| | | |
|---|---|---|
| CN | 102019924 A | 4/2011 |
| CN | 104554247 A | 4/2015 |
| CN | 104859658 A | 8/2015 |
| CN | 105599768 A | 5/2016 |
| CN | 105730227 A | 7/2016 |
| CN | 105857292 A | 8/2016 |
| CN | 106004838 A | 10/2016 |
| WO | 2004058551 A1 | 7/2004 |
| WO | 2017001017 A1 | 1/2017 |

OTHER PUBLICATIONS

First Office Action for Chinese Patent Application No. 201780084081. X, dated Dec. 21, 2020, 17 pages.

* cited by examiner

METHOD AND A SYSTEM FOR CONTROLLING A VEHICLE DURING A DOWNHILL START

This application is a 35 USC 371 national phase filing of International Application No. PCT/EP2017/051298, filed Jan. 23, 2017, the disclosure of which is incorporated herein by reference in its entirety.

TECHNICAL FIELD

The invention relates to a method and a system for controlling a vehicle during a downhill start using a service brake.

The invention can be applied in heavy-duty vehicles, such as trucks, articulated trucks, buses and construction equipment, which vehicles may be manned or unmanned. Although the invention will be described with respect to a heavy-duty vehicle, the invention is not restricted to this particular vehicle, but may also be used in other vehicles such as articulated haulers, wheel loaders, and other working machines.

BACKGROUND

When a heavy-duty vehicle is driven off in severe conditions, such as steep downhill gradient, the operator must exercise special care to avoid problems and damage to the vehicle. Starting the vehicle on a steep negative gradient requires the operator to pay special attention to the operation of the vehicle brakes and the transmission, in particular if the vehicle is carrying a high load, in order to avoid an uncontrolled acceleration down the hill. Controlling the vehicle speed using the service brake only can cause the brakes to fade due to overheating and can cause undesirable brake wear.

A missed upshift might lead to a situation where the vehicle is rolling with no gear engaged and the vehicle will accelerate quickly down the hill. This can be a problem when attempting to perform an upshift from a crawler gear or first gear into a higher gear while the driven wheels will act on the transmission output shaft through an axle differential gear. The transmission in a heavy duty vehicle can have a gear ratio of 1:30 or higher when a crawler gear is engaged. Even at low vehicle speeds the gear ratio will cause the clutch to rotate at high speed and the weight of the vehicle can transmit a high torque through the transmission. The rotary speed and torque applied to the transmission via the output shaft can seriously damage the main clutch during an improper gear change.

Hence it is desirable to provide an improved method and arrangement for controlling a vehicle during a downhill start in order to overcome the above problems.

SUMMARY

An object of the invention is to provide a method and an arrangement for controlling a vehicle during a downhill start using a service brake, which method and arrangement is described in the appended claims.

In the subsequent text, the term "gradual release" is used to describe an operational state of the service brake where the fluid pressure in the brake lines is decreased from fully applied brakes towards, but not including, completely released brakes. With the service brakes fully applied, the vehicle is maintained stationary. The terms "released" or "completely released" are used to describe an operational state of the service brake where the fluid pressure in the brake lines is decreased to a point where brake force is no longer applied to the wheels. With the service brakes released the vehicle can roll freely, influenced only by rolling resistance, engine torque drag, or similar travel resistance parameters. Fluid pressure for actuating the brakes can be supplied independently of the driver, from a suitable fluid pump or fluid accumulator. The fluid pressure supplied can be hydraulic or pneumatic pressure. Automatic control of the fluid pressure and thereby the brake force or torque allows the progress of the vehicle to be controlled as it travels downhill in response to one or more monitored parameters related to various vehicle operating conditions.

According to a preferred embodiment, the invention relates to a method to control a vehicle during a hill start. The vehicle comprises a service brake acting on the wheels of at least one axle, an engine and a transmission being arranged between the engine and at least one driven axle. The service brakes, the engine and the transmission are controlled by an electronic control unit. The method performing the steps of:

- monitoring at least one parameter related to a vehicle operating condition;
- registering that the vehicle is located on a downhill gradient;
- registering an action from the driver, indicating a request to start the vehicle;
- controlling the service brake to maintain the vehicle stationary during a predetermined time after the request before initiating a controlled service brake release;
- controlling a gradual release of the service brake in response to at least one detected first vehicle operating parameter and
- releasing the service brake when detecting that a predetermined threshold for at least one second vehicle operating parameter has been attained.

The method according to the invention is applicable for downhill gradients over a predetermined value. The electronic control unit is arranged to monitor and register the road gradient and will initiate a gradual release of the service brake if the gradient is above a predetermined threshold value after a request for starting the vehicle is made. The request for starting the vehicle can, for instance, be a signal indicating that the driver has released the brake pedal. A suitable threshold value for this purpose can be a set gradient or a gradient determined dependent on the current vehicle load. An example of a suitable set gradient can be a slope of 5% or more. If the initial gradient registered for the downhill gradient is below this value, then the downhill control method will not be required.

When the gradual release of the service brake has been initiated, the service brake is controlled to prevent uncontrolled acceleration. As indicated above, uncontrolled acceleration is undesirable, as the driven wheels of a rolling vehicle will act on the transmission output shaft through an axle differential gear which can have a gear ratio of 1:30 or higher. At the time when the vehicle starts to roll, a low gear has been pre-selected in the transmission while the clutch is disengaged. As soon as the vehicle is rolling the clutch is engaged to avoid high rotational speeds in the clutch and an uncontrolled increase in vehicle speed. In this context, a low gear can be a crawler gear or the first gear. Engaging the low gear will connect the engine to the transmission to provide a torque drag that assists the service brake in controlling the movement of the vehicle. The gradual release of the service brake can be controlled in response to a first vehicle operating parameter monitored and detected by the electronic control unit. Examples of suitable first parameters for this purpose are currently detected values for vehicle acceleration, road gradient and/or vehicle gross weight, also termed vehicle load.

The gradual release of the service brake can be controlled at different application levels depending on the local conditions. For instance, if the gradient is relatively steep then the application level can be relatively high to prevent the acceleration from increasing at an undesirable rate. A controlled gradual release of the service brake can be used for controlling the acceleration so that it is maintained constant or is increased at a fixed rate. In addition, a relatively high application level can be used when the detected road gradient is large and/or the vehicle load is high. The application level is controlled by the electronic control unit, which can monitor the local conditions and change the fluid pressure in the service brake accordingly.

The gradual release of the service brake can also be controlled at a predetermined rate in response to at least one detected vehicle operating parameter. For instance, if the road gradient is relatively large, then the service brake can be released at a fixed, slower rate. Similarly, for a smaller road gradient the service brake can be released at a fixed, faster rate. The acceleration and or the vehicle load can also be considered when determining the rate of gradual release of the service brake.

Alternatively, the gradual release of the service brake can also be controlled at a predetermined rate of change of at least one detected first vehicle operating parameter. For instance, if a monitored first parameter varies over time during the downhill travel, then a variable release rate dependent on the parameter variations can be used for the gradual release of the service brake. Hence, if a gradual increase in the road gradient is detected, then the electronic control unit can respond by slowing the rate of release, or even increase the application level if necessary.

During the downhill travel the electronic control unit is continuously monitoring at least one parameter related to a vehicle operating condition. When the electronic control unit detects that a predetermined threshold for at least one second vehicle operating parameter has been attained or passed, then the service brake is released completely. The electronic control unit releases the service brake by reducing the fluid pressure in the brake circuits until the service brake is no longer applied. Examples of suitable second parameters for this purpose are current vehicle speed, currently engaged gear, the amount of brake energy has been absorbed by the service brakes, a predetermined time period and/or engine compression brake status.

According to a first example, the service brake can be released when a predetermined vehicle speed is reached. The speed threshold can for instance be selected in the range 10-20 km/h and may be dependent on a monitored first parameter as the vehicle travels downhill. The predetermined vehicle speed can for instance be a set speed determined by an initially registered gradient, or be continuously adapted to a varying currently detected gradient.

According to a second example, a service brake release can be performed when it is detected that a predetermined gear is engaged, e.g. when the electronic control unit detects a signal indicating that the 3rd gear is engaged. In some cases, a skip-shift can be performed, in which case the control unit will detect a signal indicating that the third gear or higher is engaged.

According to a third example, a service brake release can be performed when a predetermined time period has passed after initiation of gradual service brake release. The time period can for instance be selected in the range 5-10 seconds and may be dependent on the first parameter. The predetermined time period can for instance be a set time period determined by an initially registered gradient, or be continuously adapted to a varying currently detected gradient.

According to a fourth example, a service brake release can be performed when it is detected that a predetermined amount of brake energy has been absorbed by the service brakes. The brake energy can be determined by monitoring wheel speed and brake torque over time, in order to predict an overheating condition for the service brake.

According to a final example, the service brake can be released when it is detected that the engine compression brake is operational. When the vehicle starts from stand-still the engine brake is not operational, as the compression brake power of the engine is low when travelling at low engine speed with the engine operated at low idle. The engine compression brake can be deemed operational when, for instance, it is able to provide a retardation corresponding to at least the current service brake force.

In addition, one or more second parameters described in the above examples can be combined to determine whether the service brake should be released. For instance, if a predetermined speed is reached too quickly, then service brake release can be delayed until, for instance, a set time period has passed.

The method according to the invention can be arranged to at least temporarily inhibit the gradual release of the service brake and to maintain at least the current service brake application level when registering a request for an upshift from the driver. In this example the service brake is automatically controlled when an upshift of a vehicle transmission is initiated manually by a driver or automatically by the electronic control unit. The current service brake application level can be maintained constant or be increased temporarily, in order to compensate for engine braking loss as the clutch is disengaged during the upshift. The service brake application level can be controlled to apply the service brake during the upshift in order to maintain a constant speed. Alternatively, the service brake application level can be controlled to apply the service brake during the upshift in order to maintain a constant acceleration.

The invention further relates to a control unit to control a vehicle during a downhill start. The vehicle comprises a service brake acting on the wheels of at least one axle, an engine and a transmission being arranged between the engine and at least one driven axle. The service brakes, the engine and the transmission are controlled by an electronic control unit. In operation, the electronic control unit is arranged to monitor at least one parameter related to a vehicle operating condition, to register that the vehicle is located on a downhill gradient, and to register an action from the driver indicating a request to start the vehicle. In response to the request, the electronic control unit is arranged to control the service brake to maintain the vehicle stationary during a predetermined time after the request, prior to initiation of a controlled service brake release. Subsequently, the electronic control unit is arranged to control a gradual release of the service brake in response to at least one first detected vehicle operating parameter. Finally, the electronic control unit is arranged to release the service brake when a predetermined threshold for at least one second vehicle operating parameter has been attained.

The invention further relates to a vehicle, which vehicle a commercial vehicle comprising the above-mentioned control unit.

The invention further relates to a computer program comprising program code means for performing the steps of the above-mentioned method for controlling a vehicle during a downhill start when said program is run on a computer.

The invention further relates to a computer readable medium carrying a computer program comprising program code means for performing the steps of the above-mentioned method for controlling a vehicle during a downhill start when said program product is run on a computer.

When driving in severe applications, such as down steep gradients with a high load, maneuvering and gear shifting is critical. A missed upshift might lead to no gear engaged and the vehicle will accelerate quickly down the hill. With a rear axle differential gear ratio of 1:30 or higher, a missed gear can cause a terminal clutch failure. The driver could attempt to use the service brake manually, but in that he would get no support from the vehicle during shifting, as it is difficult to compensate for the loss of the engine brake during shift by pressing harder on the brake pedal. The method according to the invention will allow automated systems for controlling the brakes and the transmission to assist the driver in avoiding this problem. The method will improve the comfort for the driver, reduce wear of the driveline and improve safety for the driver in certain critical situations.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
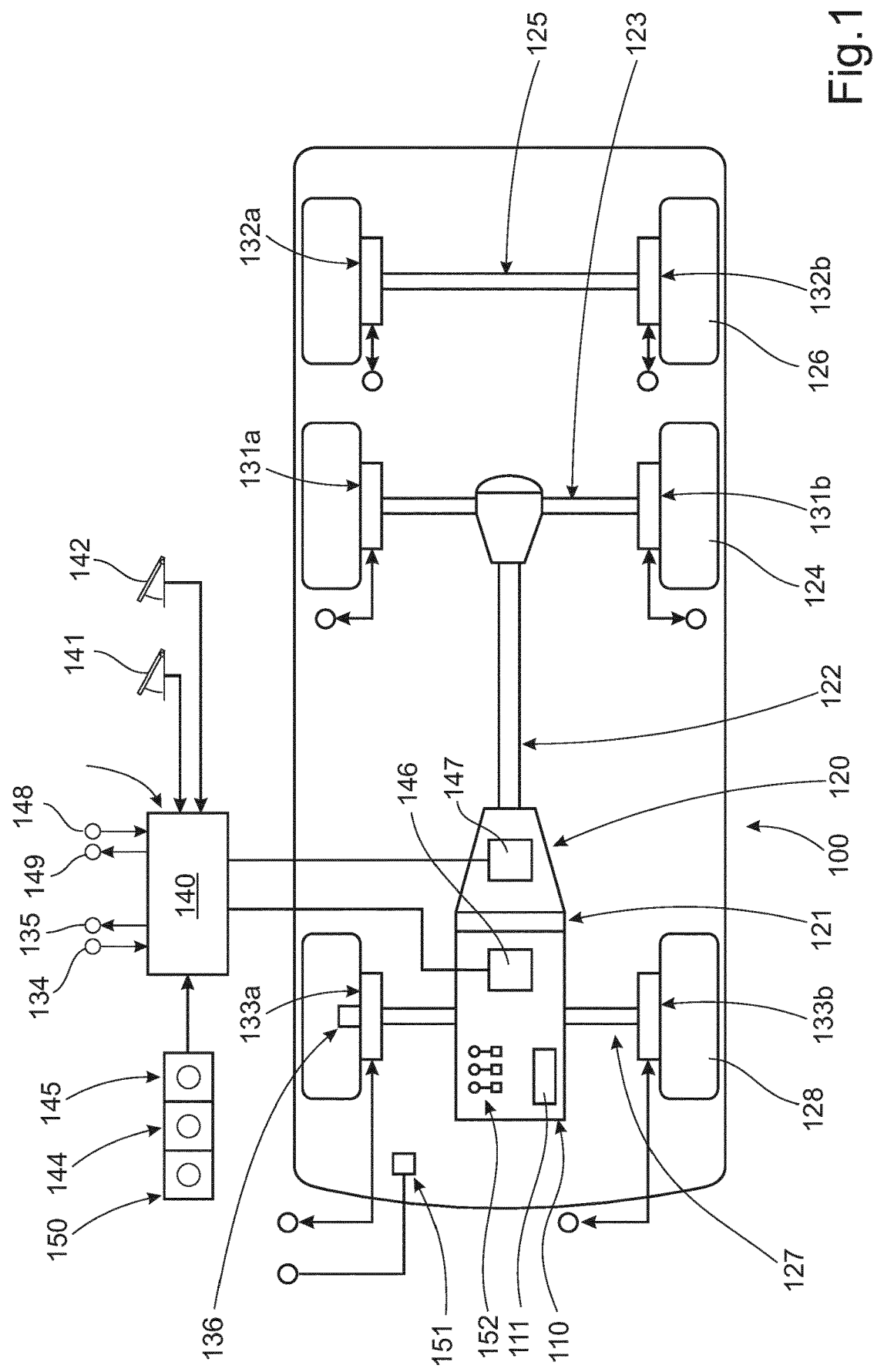
FIG. 1 shows a schematic vehicle provided with a vehicle control system according to one embodiment of the invention.

FIG. 1 shows a schematic vehicle provided with a vehicle control system according to one embodiment of the invention. FIG. 1 shows a vehicle 100, such as a tractor of a tractor semi-trailer vehicle, having an electronically controlled internal combustion engine 110 coupled to a transmission 120 via a clutch mechanism 121. It should be noted that a vehicle as shown in FIG. 1 only represents one of the possible applications for the system and method of the present invention. The present invention can be implemented in any type of commercial or industrial vehicle comprising a vehicle speed control system as described herein.

The transmission 120 in this example is an automated mechanical transmission, but can alternatively be an alternative suitable transmission connected to an output shaft 122 coupled to a driven axle 123 driving a pair of driven wheels 124. The vehicle 100 includes at least two axles such as a steerable axle 127 and at least one rear driven axle 123. FIG. 1 shows a rear driven axle 123 and a trailing axle 125 with associated wheels 124, 126, as well as a steerable axle 127 with associated wheels 128. Each axle 123, 125, 127 supports corresponding wheels 124, 126, 128 having service brake components 131a, 131b; 132a, 132b; 133a, 133b which can be manually or automatically actuated depending upon the particular application and the current operating conditions. For example, a vehicle equipped with an anti-lock braking system (ABS) can assume automatic control of braking under appropriate conditions such as when the vehicle is braking and the system detects a sufficient slip differential among one or more wheels, or when the vehicle travels downhill under the control of a cruise control system. The service brake components 131a, 131b; 132a, 132b; 133a, 133b include wheel speed sensors and electronically controlled pressure valves (not shown) to effect control of the vehicle braking system. The service brake components 131a, 131b; 132a, 132b; 133a, 133b are connected to a central electronic control unit (ECU) 140 by means of suitable wiring, as schematically indicated by the input 134 and output 135 in the figure. A wheel speed sensor 136 is schematically indicated in FIG. 1. The output signal from one or more sensors detecting parameters related to a vehicle operating condition can be used for calculating, for instance, vehicle speed, vehicle acceleration/deceleration.

The vehicle 100 includes conventional operator controls such as an accelerator pedal 141, a brake pedal 142 and a clutch pedal 143, as well as an operator interface, such as dashboard control console (not shown). In an AMT, gear shifts can be achieved without the driver manually engaging and/or disengaging a master clutch by means of the mechanical manual clutch pedal 143, which pedal is normally only used for starting the vehicle from rest, reversing or during low speed manoeuvering. When required, manual gear selection is performed by means of a gear selector 150. The dashboard control console (not shown) can include any one of a number of output devices, such as lights, displays, buzzers, gages, and the like, and various input devices, such as switches, push buttons, potentiometers, touch controls, or the like. Examples of input devices are the schematically indicated shift controllers 144, 145 for manually requesting a gear shift, such as an upshift controller 144, and a downshift controller 145. The up-/downshift controllers 144, 145 are connected to the ECU 140, which is arranged to issue shift commands to the transmission 120. The up-/downshift controllers 144, 145 can be located on the manual gear selector 150 (as schematically indicated), or alternatively on the steering wheel or dashboard control console.

The vehicle control system includes the central ECU 140 which is connected to electronic control modules 146, 147 for the engine 110 and the transmission 120, respectively. The ECU 140 also communicates with a variety of sensors via inputs 148 and with numerous actuators via outputs 149. Sensors (not shown) may include a steering angle sensor, wheel speed sensors (included in service brake components 131a, 131b; 132a, 132b; 133a, 133b), an electronic accelerator pedal angle sensor, a brake pedal sensor or switch, a clutch control/sensor, a transmission output shaft speed sensor, a sensor/accelerometer 151 for indicating road gradient, at least the longitudinal inclination thereof, and sensors for various engine parameters 152, such as current fuel injection rate and compression brake status.

During downhill travel with the control system activated the ECU 140 monitors information from the sensors and evaluates their input to determine parameters such as current engine speed and torque, brake pedal position, accelerator position, road speed, currently selected gear, shift control switches, clutch pedal position, among many others. Time is monitored by an internal clock in the ECU 140. The ECU 140 contains logic rules, or algorithms implemented in a variety of combinations of hardware circuitry components and programmed microprocessors to effect control of various vehicle systems and subsystems.

Actuators may include a shift actuator for automatically effecting a gear shift within transmission 120, electronically controlled pressure valves (included in service brake components 131a, 131b; 132a, 132b; 133a, 133b), and one or more auxiliary brakes, such as an engine retarder 111. An engine retarder is a device utilized to supplement the service brakes 131a, 131b; 132a, 132b; 133a, 133b when descending long grades and to prolong service brake life in high-frequency start and stop operation. Retarders may be categorized as engine brakes, exhaust brakes, compression brakes, hydraulic retarders and electric retarders. One example of an engine retarder is a compression brake such as the well-known "Jake brake", which converts a power producing diesel engine into a power absorbing air compressor. This is achieved by shutting off the fuel and hydraulically opening the exhaust valve as the piston approaches top dead center during the compression stroke. Many engine manufacturers disable the engine brake when cruise control is engaged. However, the present invention cannot utilize the engine retarder when starting the vehicle downhill to enhance vehicle deceleration. The reason for this is that the engine speed is too low during the initial period of downhill travel.

Figure 2A:
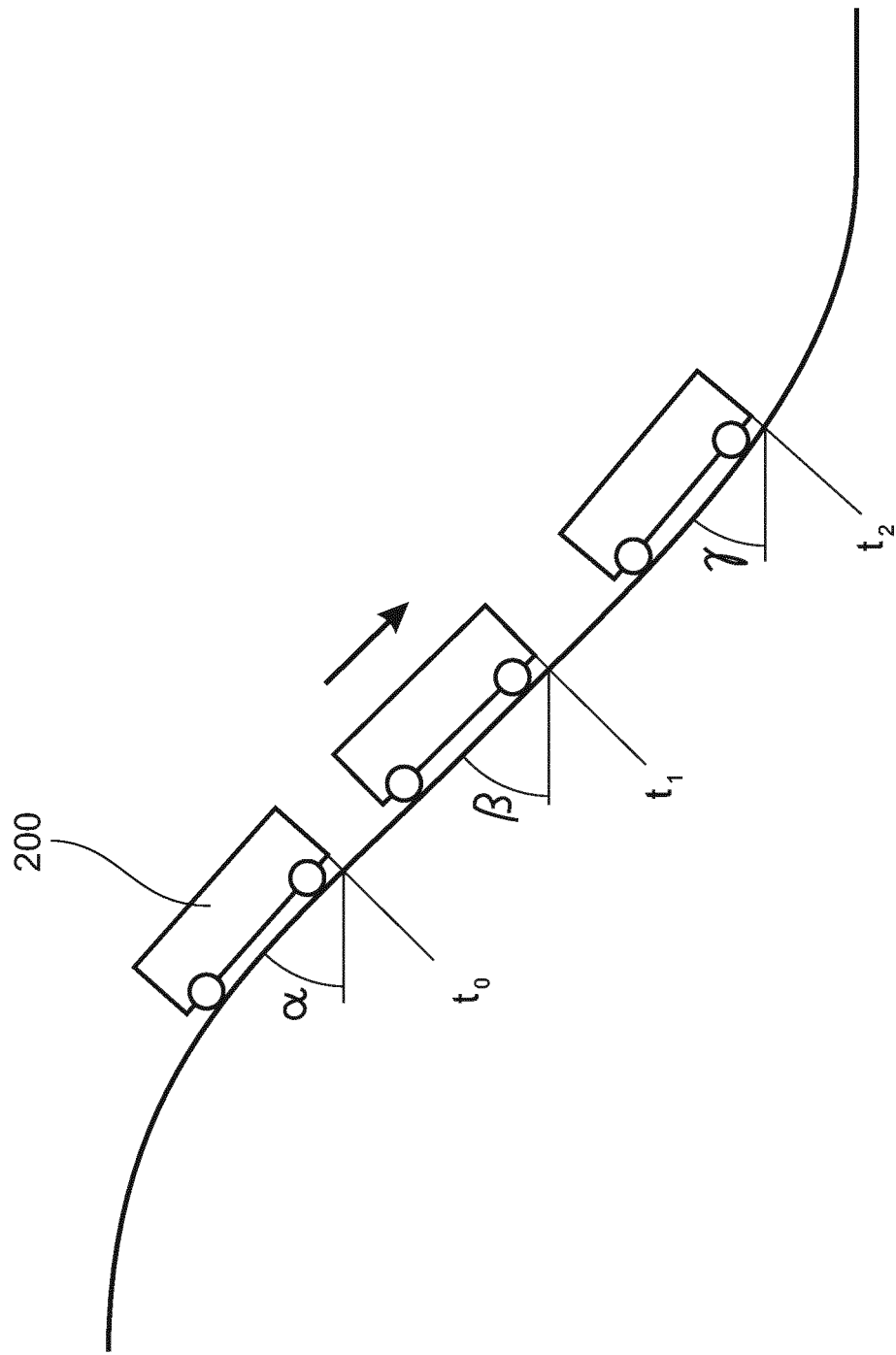
FIG. 2A shows a schematic diagram illustrating the progress of a vehicle according to the invention travelling downhill.

FIG. 2A shows a schematic diagram illustrating the progress of a vehicle according to the invention travelling downhill. In the diagram, a vehicle 200 is stationary on a downhill gradient having an angle α. If it is registered that the vehicle is located on a downhill gradient equal to or greater than a predetermined threshold, then the control system for a downhill start according to the invention is activated. An electronic control unit, such as the ECU 140 in FIG. 1, registers an action from the driver, indicating a request to start the vehicle. An example of such an action can be that the driver releases the brake pedal. The electronic control unit is arranged to delay the release of the service brake to maintain the vehicle stationary during a predetermined time after the request. At time t0 upon expiry of the time delay the electronic control unit is arranged to control a gradual release of the service brake in response to at least one detected first vehicle operating parameter, such as a detected vehicle acceleration or a detected road gradient, the latter considered in view of the vehicle load. The gradual release of the service brake allows the vehicle to begin to roll downhill. As the vehicle begins to roll, the vehicle transmission will engage a low gear, such as a crawler gear or a first gear. Gear engagement can be performed automatically or be controlled by the driver.

Subsequent control of the vehicle is dependent on at least one parameter related to a vehicle operating condition monitored by the ECU. For instance, at time t1 the ECU may detect that the acceleration has exceeded a desired threshold, or that the detected road gradient has increased to an angle β that is greater than the initial angle α. In such cases the rate of gradual release of the service brake can be reduced to control the vehicle movement within desired acceleration levels.

Alternatively, the ECU may detect a request for an upshift from the driver at time t1. In this example the service brake is automatically controlled when the upshift of a vehicle transmission is initiated manually by a driver or automatically by the electronic control unit. The current service brake application level can be maintained constant or be increased temporarily, in order to compensate for engine braking loss as the clutch is disengaged during the upshift. The service brake application level can be controlled to apply the service brake during the upshift in order to maintain a constant speed. Alternatively, the service brake application level can be controlled to apply the service during the upshift in order to maintain a constant acceleration. Once the upshift has been completed, the gradual release of the service brake is resumed.

During the downhill travel the electronic control unit is continuously monitoring at least one parameter related to a vehicle operating condition. At the time t2 the electronic control unit detects that a predetermined threshold for at least one second vehicle operating parameter has been attained or passed. The service brake is then released completely. The electronic control unit releases the service brake by reducing the fluid pressure in the brake circuits until the service brake is no longer applied. Examples of suitable second parameters for this purpose are current vehicle speed, currently engaged gear, the amount of brake energy has been absorbed by the service brakes, a predetermined time period and/or engine compression brake status. The control system for a downhill start can also be deactivated if it is detected that the vehicle is no longer accelerating, or that the current road gradient is below a minimum threshold. The threshold can be a slope of 5% (an angle of approximately 3°).

Figure 2B:
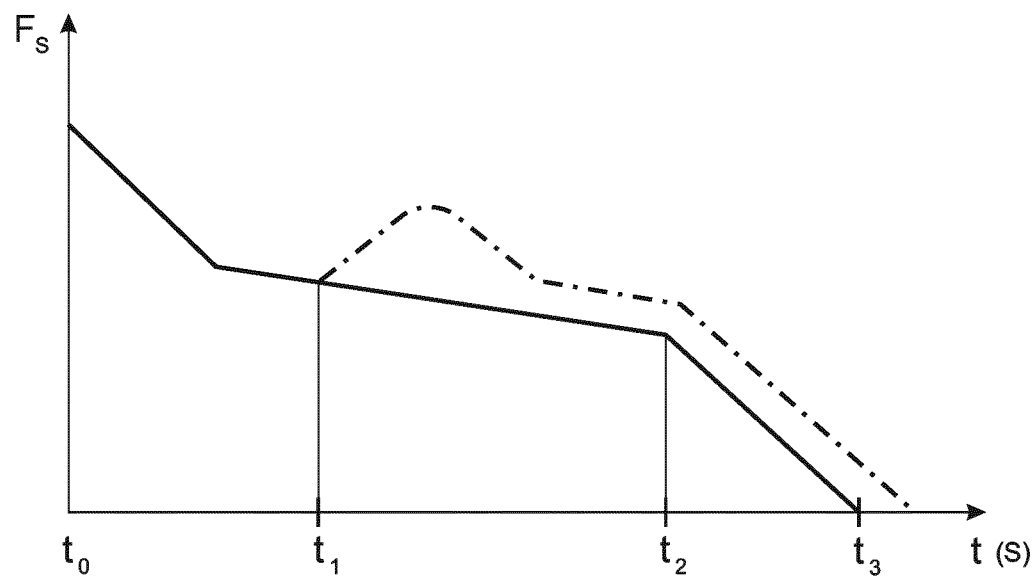
FIG. 2B shows a schematic diagram plotting service brake force Fs over time t.

FIG. 2B shows a schematic diagram plotting service brake force $F_s$ over time t when travelling down a hill as illustrated in FIG. 2A. At time $t_0$ upon expiry of the time delay the electronic control unit is arranged to control a gradual reduction of a brake force $F_s$ applied by the service brake. In order to initiate vehicle movement down the hill, the brake force $F_s$ can be decreased at a relatively higher rate over an initial period. There after the brake force $F_s$ is reduced at a lower rate, while the ECU monitors at least one first vehicle operating parameter, such as acceleration or changes in gradient. If the acceleration or the gradient does not increase above predetermined thresholds, the gradual reduction of a brake force $F_s$ continues until at least one second vehicle operating parameter is detected. As indicated in FIG. 2B, the second parameter can be a vehicle speed threshold $V_L$, which is reached at the time $t_2$ (see FIG. 2C; dashed line). Alternatively, the second parameter can be that a predetermined time period after the initial service brake release has expired at $t_2$. At this time the service brakes are released and the brake force $F_s$ is ramped down and reduced to zero at time $t_3$.

If the at least one first vehicle operating parameter monitored by the ECU, such as acceleration or changes in gradient, exceeds a threshold at the time $t_2$, then the gradual release of the service brake is interrupted. The brake force $F_s$ can be controlled either to be maintained constant at its current level or be increased temporarily (see dashed line). The detected first vehicle operating parameter can be vehicle acceleration, road gradient or a request for an upshift from the driver. For instance, if the ECU detects that the acceleration increases at a rate of change (see FIG. 2C) above a threshold, or that the road gradient increases over a predetermined angle, then the electronic control unit can respond by slowing the rate of release of the brake force, or even increase the brake force if deemed necessary. An increase the brake force can be required for sudden increases in acceleration or during an upshift in order to limit the vehicle speed or the rate of change of the acceleration. Once the rate of increase of the acceleration has been reduced to an acceptable level, when the upshift is completed, or when the gradient decreases below a predetermined angle, then the gradual release of the brake force $F_s$ can be resumed. As indicated above, the service brake is released completely when detecting that a predetermined threshold for at least one second vehicle operating parameter has been attained at time $t_2$.

Figure 2C:
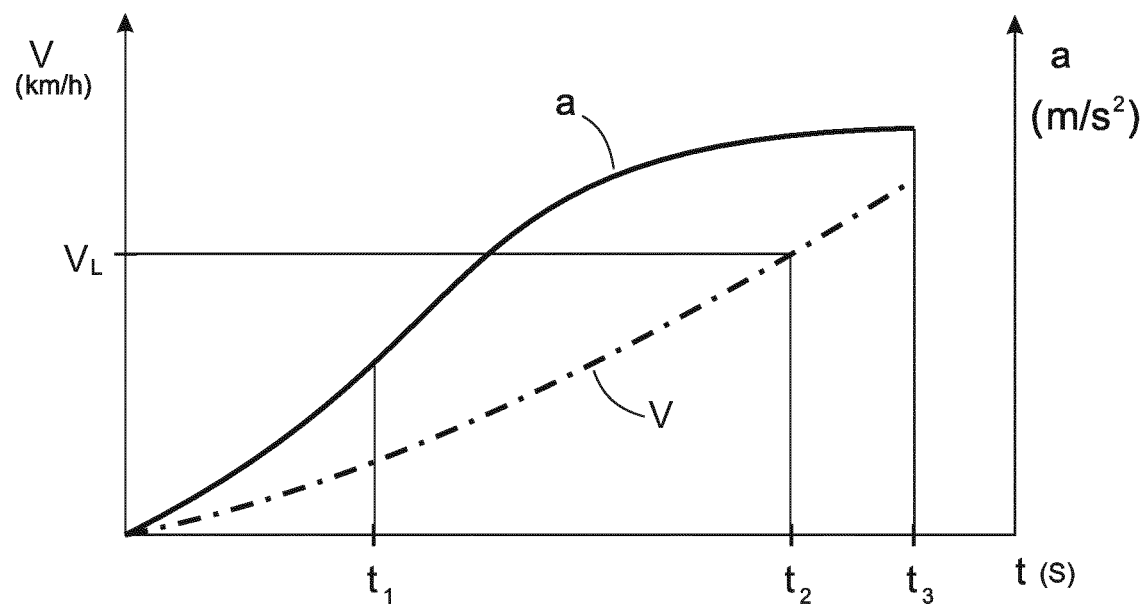
FIG. 2C shows a schematic diagram plotting speed and acceleration over time t.

FIG. 2C shows a schematic diagram plotting acceleration a and vehicle speed v over time t when travelling down a hill as illustrated in FIGS. 2A and 2B. FIG. 2C shows a curve indicating detected acceleration (full line), wherein the rate of change of acceleration exceeds a predetermined threshold at time $t_2$. This causes the service brake to be reapplied, as indicated in FIG. 2B (dashed line), which decreases the rate of change of acceleration. FIG. 2C also shows a curve indicating detected vehicle speed (dashed line), wherein a predetermined vehicle speed $V_L$ is reached at time $t_2$. This causes the service brake to be released completely, as described above.

Figure 3A:
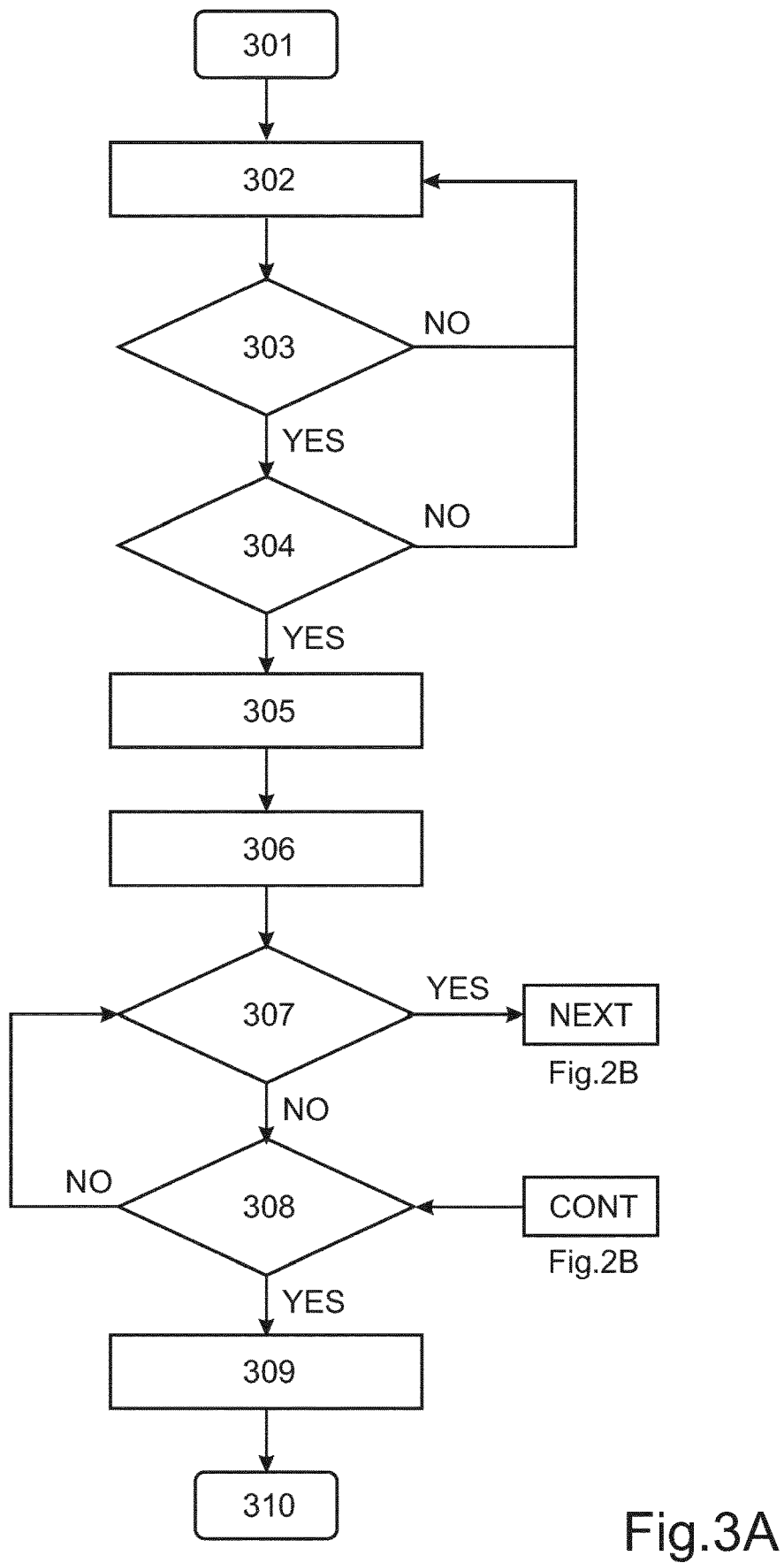
FIG. 3 shows a schematic flow chart for performing the method according to the invention.

FIG. 3 shows a schematic flow chart for a process used for performing the method according to the invention. In operation, the process starts at step 301 and the above-mentioned ECU begins monitoring at least one parameter related to a vehicle operating condition at step 302 while the vehicle is stationary. The electronic control unit is arranged to monitor and register a current road gradient and will only allow initiation of a gradual release of the service brake if the gradient is above a predetermined threshold value. If the detected gradient is below the threshold at step 303, then the process is returned to the previous step 302 to wait for the next time the vehicle is stationary. However, if the detected gradient is at least equal to the threshold angle at step 303, then the process continues to the next step 304. A suitable threshold value for this purpose can be a set gradient or a gradient determined dependent on the current vehicle load. An example of a suitable set gradient can be an angle of approximately 3° (a gradient of 5%) or more. At step 304 the ECU monitors if an action from the driver has been registered, indicating a request to start the vehicle. If no request from the driver is registered, then the process returns to step 302 to keep monitoring at least one parameter.

However, if an action from the driver has been registered, indicating a request to start the vehicle, then the process continues to step 305. At step 305 the service brake is controlled to maintain the vehicle stationary during a predetermined time after the request before initiating a controlled service brake release.

When the predetermined delay has expired, the gradual release of the service brake is initiated at step 306 and the service brake is controlled to prevent uncontrolled acceleration. At the time when the vehicle starts to roll, a transmission master clutch is controlled to engage a low gear in the transmission. The gear can be engaged manually by the operator or automatically by an AMT controller. In this context, a low gear can be a crawler gear or the first gear.

At step 307 the gradual release of the service brake is controlled in response to a first vehicle operating parameter monitored and detected by the ECU. Examples of suitable first parameters for this purpose are currently detected values for vehicle acceleration, road gradient and/or vehicle gross weight, also termed vehicle load. During the monitoring of the first vehicle operating parameter the process will simultaneously monitor a second vehicle operating parameter at step 308. As long as no thresholds are exceeded for the first or second vehicle operating parameters then the process will run in a loop between steps 307 and 308. When the ECU detects that a predetermined threshold for at least one second vehicle operating parameter has been attained or passed, then the process proceeds to step 309 and the service brake is released completely. The process then ends at step 310.

Returning to step 307: If it is determined that a threshold is exceeded for a second vehicle operating parameter, then the process will proceed to step 311 shown in FIG. 3B. Step 311 transfers the process to a parallel set of steps. In this example, the first vehicle operating parameter detected at step 307 is a request for an upshift from the driver. At step 312 the gradual release of the service brakes is interrupted and the brake force is maintained or increased in order to limit an increase of the vehicle speed or the acceleration in response to detected parameters. While the service brake is being controlled, the process proceeds to step 313 where an upshift is performed. Once the upshift has been completed the process proceeds to step 314 to check if a predetermined gear has been reached. If the ECU detects that, for instance, the transmission has shifted into third gear then this indicates that a second vehicle operating parameter has been attained. The process will proceed to step 315 and the service brake is released completely. The process then ends at step 316.

Returning to step 314: If it is determined that a predetermined gear has not been reached, then the process returns to step 308 (FIG. 3A) to re-join the main process as described above. The ECU will then continue to monitor the first and second vehicle operating parameters in steps 307 and 308.

Figure 3B:
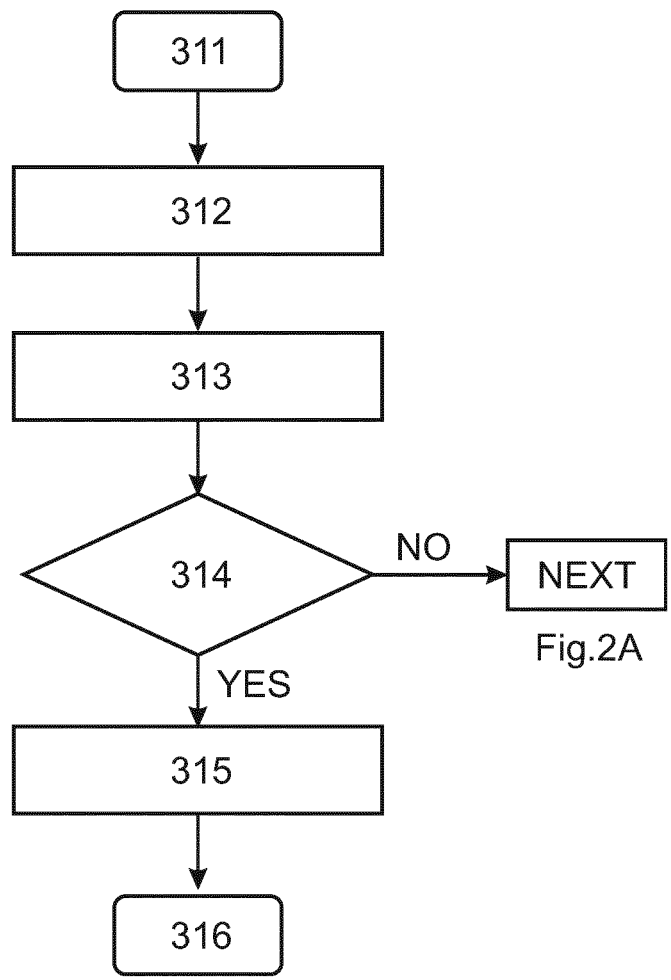

Multiple alternative parallel sets of steps, similar to those described in FIG. 3B, are possible within the scope of the invention. In addition to a request for an upshift, the gradual release of the service brake can be controlled in response to further detected first vehicle operating parameters, such as acceleration and/or road gradient.

The gradual release of the service brake can be controlled at different brake force application levels depending on detected current values for the first parameter at step 307. For instance, if the gradient is relatively steep then the application level can be relatively high to prevent the acceleration from increasing at an undesirable rate. A controlled gradual release of the service brake can be used for controlling the acceleration so that it is maintained constant or is increased at a fixed rate. In addition, a relatively high application level can be used when the detected road gradient is large and/or the vehicle load is high. The application level is controlled by the electronic control unit, which can monitor the local conditions and change the fluid pressure in the service brake accordingly.

The gradual release of the service brake can also be controlled at a predetermined rate in response to at least one detected first vehicle operating parameter at step 307. For instance, if the road gradient is relatively large, then the service brake can be released at a fixed, slower rate. Similarly, for a smaller road gradient the service brake can be released at a fixed, faster rate. The acceleration and or the vehicle load can also be considered when determining the rate of gradual release of the service brake.

Alternatively, the gradual release of the service brake can also be controlled at a predetermined rate of change of at least one detected first vehicle operating parameter at step 307. For instance, if a monitored first parameter varies over time during the downhill travel, then a variable release rate dependent on the parameter variations can be used for the gradual release of the service brake. Hence, if a gradual increase in the road gradient is detected, then the electronic control unit can respond by slowing the rate of release, or even increase the application level if necessary.

During the downhill travel the electronic control unit is continuously monitoring at least one first parameter related to a vehicle operating condition at step 307. The control of the service brake is continued in accordance with the above-mentioned examples until the electronic control unit detects that a predetermined threshold for at least one second vehicle operating parameter has been attained or passed at step 308. The service brake is then released completely. Examples of suitable second parameters for this purpose are current vehicle speed, currently engaged gear, the amount of brake energy has been absorbed by the service brakes, a predetermined time period and/or engine compression brake status.

According to a first example, the service brake can be released when it is detected that a predetermined vehicle speed is reached at step 308. The speed threshold can for instance be selected in the range 10-20 km/h and may be dependent on a monitored first parameter as the vehicle travels downhill. The predetermined vehicle speed can for instance be a set speed determined by an initially registered gradient, or be continuously adapted to a varying currently detected gradient.

According to a second example, a service brake release can be performed when it is detected that a predetermined gear is engaged, e.g. when the electronic control units detects a signal indicating that the 3rd gear (or higher) is engaged at step 308 or 314.

According to a third example, a service brake release can be performed when a predetermined time period has passed after initiation of gradual service brake release at step 308. The time period can for instance be selected in the range 5-10 seconds, and may be dependent on the first parameter. The predetermined time period can for instance be a set time period determined by an initially registered gradient, or be continuously adapted to a varying currently detected gradient.

According to a fourth example, a service brake release can be performed when it is detected that a predetermined amount of brake energy has been absorbed by the service brakes at step 308. The brake energy can be determined by monitoring wheel speed and brake torque over time, in order to predict an overheating condition for the service brake.

According to a final example, the service brake can be released when it is detected that the engine compression brake is operational at step 308. When the vehicle starts from stand-still the engine brake is not operational, as the compression brake power of the engine is low when travelling at low engine speed with the engine operated at low idle. The engine compression brake can be deemed operational when, for instance, it is able to provide a retardation corresponding to at least the current the service brake force.

The present invention also relates to a computer program, computer program product and a storage medium for a computer all to be used with a computer for executing the method as described in any one of the above examples.

Figure 4:
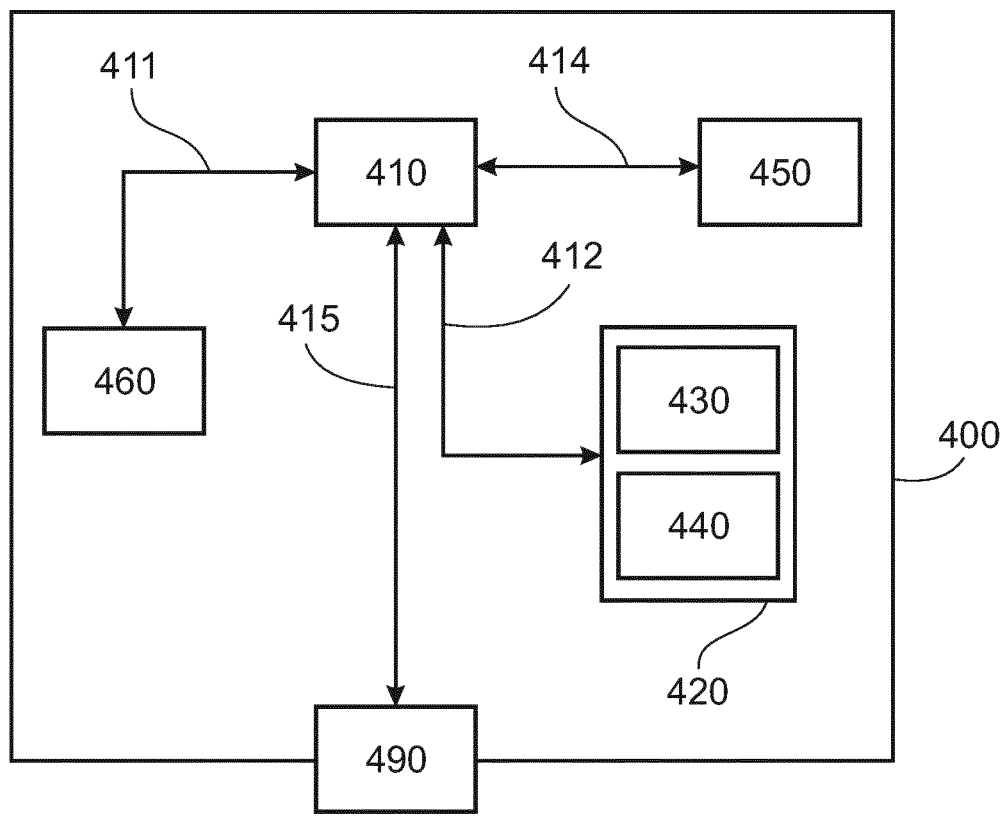
FIG. 4 shows the invention applied on a computer arrangement.

FIG. 4 shows an apparatus 400 according to one embodiment of the invention, comprising a non-volatile memory 420, a processor 410 and a read and write memory 460. The memory 420 has a first memory part 430, in which a computer program for controlling the apparatus 400 is stored. The computer program in the memory part 430 for controlling the apparatus 400 can be an operating system.

The apparatus 400 can be enclosed in, for example, a control unit, such as the control unit 45. The data-processing unit 410 can comprise, for example, a microcomputer. The memory 420 also has a second memory part 440, in which a program for controlling the target gear selection function according to the invention is stored. In an alternative embodiment, the program for controlling the transmission is stored in a separate non-volatile storage medium 450 for data, such as, for example, a CD or an exchangeable semiconductor memory. The program can be stored in an executable form or in a compressed state.

When it is stated below that the data-processing unit 410 runs a specific function, it should be clear that the data-processing unit 410 is running a specific part of the program stored in the memory 440 or a specific part of the program stored in the non-volatile storage medium 420.

The data-processing unit 410 is tailored for communication with the storage memory 420 through a data bus 414. The data-processing unit 410 is also tailored for communication with the memory 420 through a data bus 412. In addition, the data-processing unit 410 is tailored for communication with the memory 460 through a data bus 411. The data-processing unit 410 is also tailored for communication with a data port 490 by the use of a data bus 415.

It is to be understood that the present invention is not limited to the embodiments described above and illustrated in the drawings; rather, the skilled person will recognize that many changes and modifications may be made within the scope of the appended claims.

The invention claimed is:

1. A method to control a vehicle during a downhill start, the vehicle comprising a service brake acting on the wheels of at least one axle, an engine and a transmission being arranged between the engine and at least one driven axle, wherein the service brakes, the engine and the transmission are controlled by an electronic control unit, characterized by the method performing the steps of:
   registering that the vehicle is located on a downhill gradient;
   registering an action from the driver, indicating a request to start the vehicle;
   controlling the service brake to maintain the vehicle stationary during a predetermined time after the request before initiating a controlled service brake release;
   controlling a gradual release of the service brake in response to at least one detected first vehicle operating parameter; and
   releasing the service brake when detecting that the transmission has upshifted to a predetermined gear.

2. A method according to claim 1, wherein the at least one detected first vehicle operating parameter comprises a detected vehicle acceleration.

3. A method according to claim 1, wherein the at least one detected first vehicle operating parameter comprises a detected gradient and a vehicle load.

4. A method according to claim 1, wherein the at least one detected first vehicle operating parameter comprises a gradient above a predetermined threshold value.

5. A method according to claim 4, wherein the predetermined threshold Value is 5%.

6. A method according to claim 1, wherein controlling the gradual release of the service brake is at a predetermined rate in response to the at least one detected first vehicle operating parameter.

7. A method according to claim 1, wherein the at least one detected first vehicle operating parameter comprises a predetermined rate of change of a monitored parameter.

8. A method according to claim 1, further comprising releasing the service brake completely when detecting a predetermined vehicle speed.

9. A method according to claim 8, further comprising selecting the vehicle speed in the range 10 to 20 km/h.

10. A method according to claim 1, wherein releasing the service brake completely is when detecting the transmission has upshifted at least to the third gear.

11. A method according to claim 1, further comprising releasing the service brake completely when detecting that a predetermined amount of brake energy has been absorbed by the service brakes.

12. A method according to claim 1, further comprising fully releasing the service brake when detecting that a predetermined time period has passed.

13. A method according to claim 12, wherein the time period is in the range 5 to 10 seconds.

14. A method according to claim 1, further comprising fully releasing the service brake completely when detecting that an engine compression brake is operational.

15. A method according to claim 1, further comprising inhibiting the gradual release and maintaining at least the current service brake application level when detecting a request for an upshift from the driver.

16. A method according to claim 15, further comprising applying the service brake during the upshift in order to maintain a constant speed.

17. A method according to claim 15, further comprising applying the service brake during the upshift in order to maintain a constant acceleration.

18. A control unit to control a vehicle during a downhill start, the vehicle comprising a service brake acting on the wheels of at least one axle, an engine and a transmission being arranged between the engine and at least one driven axle, the control unit configured to:
register that the vehicle is located on a downhill gradient;
register an action from the driver, indicating a request to start the vehicle;
control the service brake to maintain the vehicle stationary during a predetermined time after the request, prior to initiation of a controlled service brake release;
control a gradual release of the service brake in response to at least one detected first vehicle operating parameter:
release the service brake when detecting that the transmission has upshifted to a predetermined gear.

19. A control until according to claim 18, wherein the vehicle is a commercial vehicle, and the control unit is contained within the vehicle.

* * * * *